United States Patent [19]

Sakai

[11] Patent Number: 4,795,933

[45] Date of Patent: Jan. 3, 1989

[54] SALIENT-POLE ROTARY ELECTRIC MACHINE

[75] Inventor: Koichi Sakai, Katsuta, Japan

[73] Assignee: Hitachi, Ltd., Tokyo, Japan

[21] Appl. No.: 518,108

[22] Filed: Jul. 28, 1983

[30] Foreign Application Priority Data

Aug. 6, 1982 [JP] Japan ................... 59-136267

[51] Int. Cl.⁴ ............................................. H02K 1/24
[52] U.S. Cl. ...................... 310/269; 310/55; 310/58; 310/61
[58] Field of Search ............. 310/269, 214, 52, 53, 310/57, 58, 59, 60 R, 60 A, 61, 64, 65, 55

[56] References Cited

U.S. PATENT DOCUMENTS

| | | | |
|---|---|---|---|
| 2,899,573 | 8/1959 | Wesolowski | 310/269 |
| 2,974,239 | 3/1961 | Havelka | 310/269 |
| 3,160,770 | 12/1964 | Asantcheeff | 310/57 |
| 3,514,647 | 5/1970 | Lipstein | 310/60 R |
| 3,932,778 | 1/1976 | Watanabe | 310/61 |
| 4,246,505 | 1/1981 | Yasaka | 310/269 |
| 4,306,165 | 12/1981 | Kitabayashi | 310/269 |

FOREIGN PATENT DOCUMENTS

| | | | |
|---|---|---|---|
| 2841231 | 4/1979 | Fed. Rep. of Germany | 310/269 |
| 0129407 | 10/1979 | Japan | 310/269 |
| 1396327 | 6/1975 | United Kingdom | 310/269 |

Primary Examiner—R. Skudy
Attorney, Agent, or Firm—Antonelli, Terry & Wands

[57] ABSTRACT

A salient-pole rotary electric machine comprises a stator including a stator core formed with a plurality of ventilation ducts spaced apart by a predetermined distance in its axial direction and extending in its radial direction, and a stator winding would around the stator core, and a rotor including a rotor shaft, a rotor rim rotatable together with the rotor shaft, a plurality of salient field poles disposed on the outer periphery of the rotor rim in circumferentially spaced apart relation and extending in the axial direction of the rotor rim, and cooling gas passages defined between every adjacent salient field poles. In the rotary electric machine, a closure member is bured in each of the cooling gas passages between the salient field poles to extend from one of the axial ends to the center of the cooling gas passage, and the closure members are disposed between the adjacent salient field poles in a relation alternate with each other in the axial direction of the salient field poles. The alternate arrangement of the closure members reduces the mechanical losses of the salient-pole rotary electric machine and ensures uniform cooling of the stator throughout the axial length of the stator.

2 Claims, 3 Drawing Sheets

SALIENT-POLE ROTARY ELECTRIC MACHINE

BACK OF THE INVENTION

This invention relates rotary electric machines of salient pole type, and more particularly, to an improvement in a rotary electric machine of the type above described which is so constructed that cooling gas flows axially into the spaces between the field poles of the rotor and is then discharged radially outward from the rotor.

In, for example, U.S. Pat. No. 3,160,770, a ventilating arrangement in a salient-pole rotary electric machine is employed wherein the spaces between the adjacent field poles of the rotor and the gaps between the field poles of the rotor and the opposing portions of the stator provide cooling gas passages, and streams of cooling gas flow in countercurrent relationship from the both axial end faces of the rotor into the cooling gas passages. However, a disadvantage of such a proposed ventilating arrangement resides in the fact that not only collision of the countercurrent streams of cooling gas resulting in an increased windage loss occurs in the cooling gas passage portions in the axially central part of the rotor, but also, the quantity of cooling gas discharged from the rotor toward the stator is non-uniform or excessively larger in the axially central part of the rotor than the remaining parts, thereby obstructing desired uniform cooling of the stator winding which is to be cooled by the cooling gas discharged from the rotor.

In an effort to obviate such a defect of the axial-flow ventilation arrangement, a radial-flow ventilation arrangement (called a rim-duct ventilation arrangement) has been proposed and put into practical use in which a plurality of axially-spaced radial ducts are provided in the rotor rim supporting the rotor field poles so that cooling gas can flow between the field poles along the full axial length of the field poles. This radial-flow ventilation arrangement has been effective for uniformly cooling the stator throughout the axial length thereof thereby considerably improving the aforementioned defect of the axial-flow ventilation arrangement. However, the proposed radial-flow ventilation arrangement has not been applicable to all of salient-pole rotary electric machines. For example, this radial-flow ventilation arrangement has not been applicable to a salient-pole rotary electric machine in which such radial ducts are difficult to be formed in the rotor rim from the viewpoint of the construction or mechanical strength. Also, even if this ventilation arrangement could be applied to such a salient-pole rotary electric machine somehow, the mechanical loss (windage loss) peculiar to the salient pole type has been considerably large, and a further improvement has been demanded.

In order to avoid such prior art drawbacks, it is a primary object of the present invention to provide an improved rotary electric machine of the salient pole type which can operate with a reduced windage loss and whose stator can be uniformly cooled throughout its axial length.

The techniques for improvements in the efficiency of rotary electric machines have made a remarkable progress in recent years by virtue of the penetration of the campaign of energy saving in this and other fields. In addition to the reduction of the stray load loss, iron loss, etc., the copper loss has also been reduced by decreasing the density of current flowing through the conductors of rotary electric machines. The reduction of these losses, especially, tne reduction of the load losses, such as the stray load loss and copper loss have made it posssible to reduce the quantity of cooling gas required for cooling the stator winding and rotor winding, and the development of the electrical insulation technique, ensuring a high degree of thermal resistivity, has made it possible to further reduce the required quantity of cooling gas. The present invention is based on the fact that the progress of the technology has made possible to reduce the quantity of cooling gas required for cooling the stator of a rotary electric machine of the salient pole type. In accordance with the present invention a rotary electric machine of the salient pole type is provided which comprises a stator including a stator core and a stator winding wound around the stator core, the stator core being formed with a plurality of ventilation ducts spaced apart by a predetermined distance in its axial direction and extending in its radial direction, and a rotor including a rotor shaft, a roto rim rotatable together with the rotor shaft, a plurality of salient field poles disposed on the outer periphery of the rotor rim in circumferentially spaced apart relation and extending in the axial direction of the rotor rim, and cooling gas passages defined between every adjacent salient field poles, wherein a closure member having a total length about one-half that of the salient field pole is buried in each of the cooling gas passages between the salient field poles to extend from one of tee axial ends to the center of the cooling gas passage, and the closure members are disposed between the adjacent, salient field poles in an alternate relationship with each other in the axial direction of the salient field poles.

DESCRIPTION OF THE PREFERRED EMBODIMENTS

A preferred embodiment of the present invention will now be described in the detail with reference to the drawings.

Figure 1:
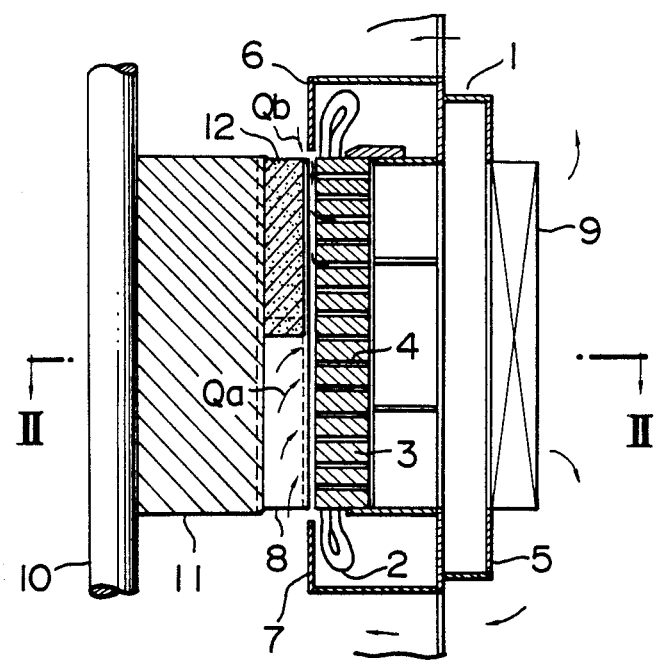
FIG. 1 is a longitudinal sectional view of part of a preferred embodiment of the salient-pole rotary electric machine according to the present invention.
Figure 2:
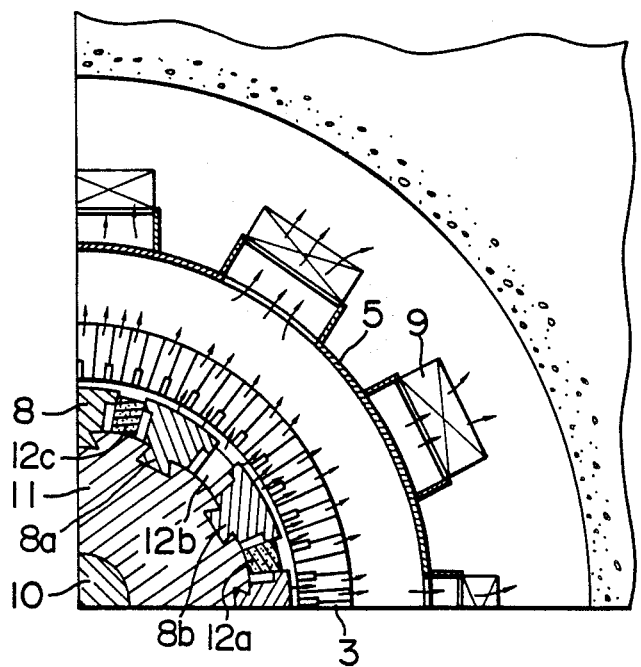
FIG. 2 is a sectional view taken along the line A—A in FIG. 1.

Referring to FIGS. 1 and 2, a stator part of the salient-pole rotary electric machine embodying the present invention generally designated by the reference numeral 1 includes a stator winding 2, around a stator core 3, and a stator frame 5. A plurality of ventilation ducts 4 extend radially through the stator core 3 to serve as passages for cooling gas fed for cooling the stator core 3 and stator winding 2. Ventilation guides 6 and 7 prevent backward flow of cooling gas from the stator part toward salient field poles 8 (described later) by the fan action of the salient field poles 8, with coolers 9 being mounted on the stator frame 5.

The rotor part inclues a rotor shaft 10, a rotor rim 11 fixedly mounted on the rotor shaft 10, and a plurality of salient field poles 8. These salient field poles 8 are disposed on the outer periphery of the rotor rim 11 in circumferentially spaced apart relationship and extend in the axial direction of the rotor rim 11.

Figure 3:
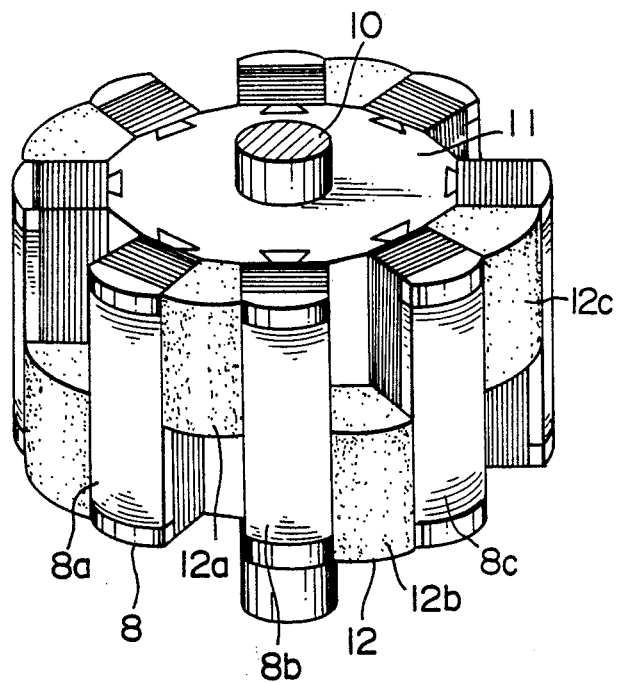
FIG. 3 is a perspective view of part of the rotor of the rotary electric machine shown in FIG. 1.

Closure members 12a and 12b made of an electrical insulatin material, are, respectively disposed between the adjacent field poles 8. As shown in FIGS. 2 and 3, the closure members 12a, 12b have a radial width such that each closure member 12a, 12b extends from approximately an outer peripheral surface of the field poles 8 to an outer peripheral surface of the rotor rim 11 so as to prevent cooling gas from flowing in an axial direction of the respective closure members 12a, 12b. As will be apparent from FIG. 3, these closure members 12a and 12b have a total length about one-half the axial length of the salient field poles 8. It will be also seen in FIG. 3 that, in the case of, for example, the closure member 12a, it is disposed in the upper half of the space defined between the salient field poles 8a and 8b, while, in the case of the closure member 12b, it is disposed in the lower half of the space defined between the salient field pole 8b and that next adjacent to but remote from the salient field pole 8a. Thus, these closure members 12 are alternately disposed in the upper and lower halves of the spaces defined between the adjacent salient field poles 8. As shown in FIG. 1, the cooling gas flows first into the cooling gas passages between the salient field poles 8 from the axial ends of the rotor rim 11. In this case, the cooling gas flows into the cooling gas passages between the salient field poles 8 as alternate axial streams, since the closure members 12 are disposed between the salient field poles 8 in such a relationship that they are alternately disposed in the upper and lower halves of the cooling gas passages defined between the adjacent salient field poles 8, as described above. These streams of cooling gas are shown in FIG. 1 by the arrows Qa and Qb, respectively.

Part of each of these streams of cooling gas fed into each of the cooling gas passages between the field poles 8 flows through this cooling gas passage, and its flowing direction is diverted radially outward at about the center of the cooling gas passage. That is, the inner end wall of the closure member 12 terminating at the center of the cooling gas passage acts to change the flowing direction of cooling gas. Thereafter, the streams of cooling gas flow through the ventilation ducts 4 formed in the stator core 3 to arrive at the inlet of the coolers 9 in usual manner.

Therefore, according to the present invention, the streams of cooling gas Qa and Qb do not flow into the same cooling gas passage between the field poles 8 from the axial ends of the rotor rim 11, so that the streams of cooling gas do not collide with each other in the axially central area of the cooling gas passage between the field poles 8, and the quantity of cooling gas does not become excessively larger in that area than the remaining areas. Further, because of the fact that the closure members 12 close part of or, more precisely, about the half of all the spaces between the field poles 8, the outer surface profile of the rotor approaches from the indented one to the cylindrical one thereby correspondingly reducing the windage loss.

Figure 4:
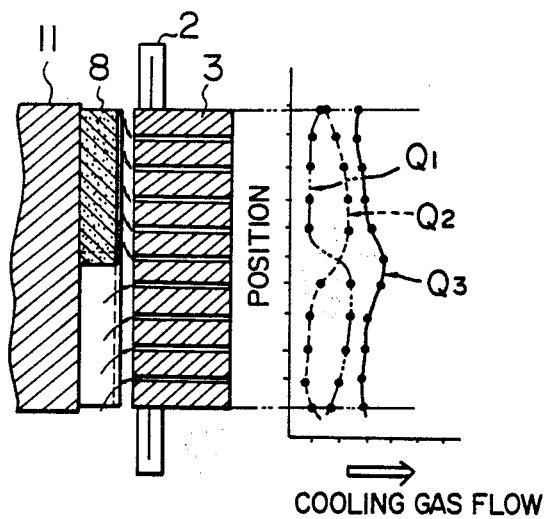
FIG. 4 is a graph showing the relationship between the total axial length of the stator core and the flow of cooling gas.

In the embodiment of the present invention, the closure members 12 are buried between the field poles 8 as described above. Therefore, the flow of cooling gas will be reduced by the quantity corresponding to the volume of the closure members 12, and the cooling effect will also be partially reduced. However, as shown in FIG. 4, experimental results using an actual machine model have proved that the flow of cooling gas is generally uniform throughout the axial length of the stator part although the total quantity of cooling gas flow is somewhat reduced. More precisely, in FIG. 4, the chain-line curve Q1 represents the cooling gas flow when the closure members 12 are disposed in the upper half of FIG. 4, the dotted-line curve Q2 represents the cooling gas flow when the closure members 12 are disposed in the lower half of FIG. 4, and the solid-line curve Q3 represents the total cooling gas flow in the ventilation ducts 4 of the stator core. It will be seen from the curve Q3 in FIG. 4 that the flow of cooling gas is generally uniform throughout the axial length of the stator core.

Figure 5:
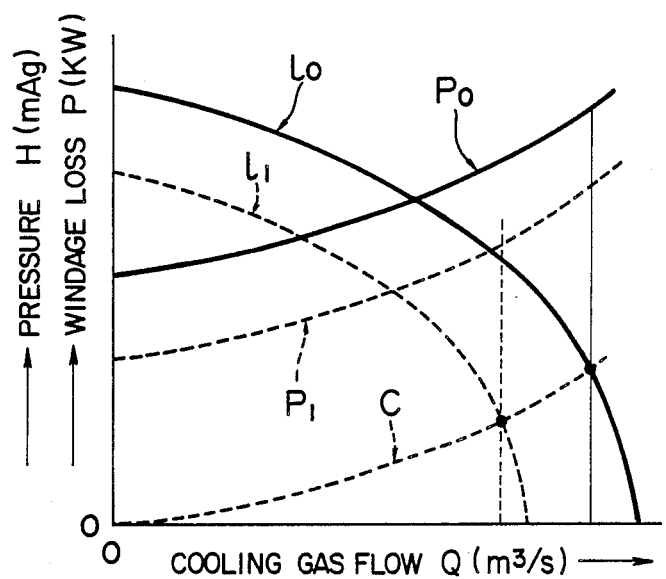
FIG. 5 is a graph showing the windage loss and pressure relative to the flow of cooling gas.

FIG. 5 is a graph showing the results of actual measurement of the relationship between the windage loss and the flow of cooling gas and the relation between the pressure and the flow of cooling gas. In FIG. 5, the solid-line curve $l_0$ represents the relationship between the windage loss and the cooling gas flow in a prior art salient-pole rotary electric machine, while the dotted-line curve $p_1$ represents the same relationship in the salient-pole rotary electric machine of the present invention.

Also, in FIG. 5, the solid-line curve $p_0$ represents the relationship between the pressure and the cooling gas flow in the prior art machine, while the dotted-line curve $p_1$ represents the same relationship in the machine of the present invention. The dotted-line curve c in FIG. 5 represents the ventilation resistance, and the intersections between the curve c and the curves $l_0$, $l_1$ indicate the operaing points, respectively.

It will be apparent from FIG. 5 that, although the windage loss in the salient-pole rotary electric machine of the present invention does not show a marked difference between it and that in the prior art salient-pole rotary electric machine when the flow of coolin gas is small, there appears a marked difference therebetween with the increase in the cooling gas flow, that is, at the cooling gas flow level in the operating condition, and this proves the superiority of the salient-pole rotary electric machine of the present invention to the prior art one.

It will be understood from the foregoing detailed description that, according to the salient-pole rotary electric machine of the present invention, a closure member having a total length about one-half that of the salient field pole is buried in each of the cooling gas passages between the salient field poles to extend from one of the axial ends to the center of the cooling gas passage, and the closure members are disposed between the adjacent salient field poles in a relation alternate with each other in the axial direction of the salient field poles. Therefore, in the rotary electric machine of the present invention, the streams of cooling gas can be prevented from colliding with each other in the same cooling gas passage, the quantity of cooling gas does not become excessively larger in the axially central area of the cooling gas passage than the remaining areas, and the rotor has an outer surface profile which reduces the windage loss.

I claim:

1. A rotary electric machine of a salient pole type comprising a stator including a stator core and a stator winding wound around said stator core, said stator core being formed with a plurality of ventilation ducts spaced apart by a predetermined distance in its axial direction and extending in its radial direction, and a rotor including a rotor shaft, a rotor rim rotatable together with said rotor shaft, a plurality of salient field poles disposed on the outer periphery of said rotor rim in circumferentially spaced apart relationship and extending in the axial direction of said rotor rim, and cooling gas passages defined between every adjacent salient field pole, wherein a closure member having a total length about one-half that of the salient field pole is buried in each of said cooling gas passages between said salient field poles to extend from one of the axial ends to the center of said cooling gas passage, said closure members are being disposed between the adjacent salient field poles in an alternate relationship with each other in the axial direction of said salient field poles, and said closure members have a radial width such that each closure member extends from approximately an outer peripheral surface of the field poles to an outer peripheral surface of the rotor rim whereby cooling gas is prevented from flowing in an axial direction of the respective closure members.

2. A rotary electric machine of the salient pole type as claimed in claim 1, wherein said closure members are made of an electrical insulating material.

* * * * *